(12) United States Patent
O'Konski et al.

(10) Patent No.: US 6,996,500 B2
(45) Date of Patent: Feb. 7, 2006

(54) METHOD FOR COMMUNICATING DIAGNOSTIC DATA

(75) Inventors: Timothy O'Konski, Palo Alto, CA (US); Ashish Karkare, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/284,842

(22) Filed: Oct. 30, 2002

(65) Prior Publication Data

US 2004/0088140 A1    May 6, 2004

(51) Int. Cl.
G06F 11/30    (2006.01)

(52) U.S. Cl. .......................................... 702/186; 714/48

(58) Field of Classification Search .................... 714/4, 714/48, 25; 709/203; 702/108, 117, 183, 702/185, 186, 188
See application file for complete search history.

(56) References Cited

U.S. PATENT DOCUMENTS

| | | | | |
|---|---|---|---|---|
| 6,208,948 B1 * | 3/2001 | Klingler et al. | ............. | 702/183 |
| 6,237,114 B1 * | 5/2001 | Wookey et al. | ............... | 714/47 |
| 6,457,066 B1 * | 9/2002 | Mein et al. | .................. | 719/330 |
| 6,460,070 B1 * | 10/2002 | Turek et al. | ................ | 709/202 |
| 6,622,271 B1 * | 9/2003 | Colby et al. | ................ | 714/724 |
| 6,662,217 B1 * | 12/2003 | Godfrey et al. | ............. | 709/219 |
| 6,691,249 B1 * | 2/2004 | Barford et al. | ............... | 714/25 |
| 2003/0115018 A1 * | 6/2003 | Sharma et al. | .............. | 702/183 |

FOREIGN PATENT DOCUMENTS

| | | |
|---|---|---|
| WO | WO01/39042 | 5/2001 |
| WO | WO2003093932 | 11/2003 |

OTHER PUBLICATIONS

Dialogic Corporation; Sep. 2001; "Dialogic Universal Hardware Diagnostics Guide".*
Bidoli, Marina; Financial Mail; Jul. 12, 2002; "Giving Systems the Ability to Communicate"—3 pages.*
Strom, David; Varbusiness; Jun. 12, 2002; "Tools of the Trade"—5 pages.*
Bidoli, Marina; Financial Mail; Jul. 12, 2002; "Giving Systems the Ability to Communicate"—3 pages.*
Canosa, John; iApplianceWeb; Mar. 8, 2002, "Embedded Developers Should Take Web Services Seriously"—6 pages.*
Canosa, Jon; iApplianceWeb; Feb. 1, 2002, "Introduction to Web Services"—9 pages.*
Ed Ort, et al.; "The Java Web Services Developer Pack" Feb. 2002; 19 pages; http://java.sun.com/developer/technicalArticles/WebServices/WSPack/.

* cited by examiner

Primary Examiner—Marc S. Hoff
Assistant Examiner—Paul Kim

(57) ABSTRACT

The present invention is a method for communicating diagnostic data. In one embodiment, a platform specific characteristic of a computer is ascertained using a computer application that is compliant with a platform independent specification. A message is received requesting diagnostic information about the computer, and a reply is sent conveying diagnostic information about the computer.

25 Claims, 4 Drawing Sheets

METHOD FOR COMMUNICATING DIAGNOSTIC DATA

TECHNICAL FIELD

Embodiments of the present invention are related to the field of communicating diagnostic data.

BACKGROUND ART

A considerable effort goes into making critical business systems as failure-proof as possible prior to their deployment. These efforts are primarily focused upon improving the Mean Time To Failure (MTTF) of such systems through increased fault tolerance and redundancy. However, such systems still suffer from unplanned failures despite the best efforts of the system designers and operators. When such failures or "faults" happen, the goal is to reduce the Mean Time To Repair (MTTR). For example, hot-swappable hard drives allow administrators to quickly replace failed units without necessitating costly down time for their system.

This means that fault monitoring and prediction is an integral part of most Enterprise Systems Management solutions. Identifying and reporting the occurrence of faults contributes to a reduction in MTTR, and thus helps in preventing extended outages of business computing infrastructure.

The goal of most diagnostic tools is to improve the Mean Time To Repair by providing tools that improve the efficiency of the resolution process once a fault has been identified; and that improve the ability to predict faults. This facilitates identifying potential faults so that they can be repaired before they become serious failures.

The process of diagnosis typically begins with the identification of a fault during operations. Fault isolation is a key step for resolving such problems. Once faults are isolated, specialized platform tools can be brought in for further analysis. Performance and reliability problems typically discovered during operations share similar characteristics. For example, they are often transient in nature and may have a locality attribute (e.g., they affect only certain transactions, certain users, and/or certain geographies). Additionally, they are often reproducible only under certain load conditions and often not reproducible outside the operational system.

Predictive diagnostics takes the concept of simple fault monitoring to the next level by tracking intermittent faults over an extended period of time, and predicting when an intermittent failure is likely to turn into a serious outage. Most Enterprise Management solutions rely upon intermittent failure data (e.g. parity errors, disk stutter) to indicate and predict failures. The ability to predict faults significantly reduces MTTR, some times to zero, if problems can be resolved before they occur.

Monitoring the availability of hardware and software is a key task of Systems Management solutions. Many current Systems Management solutions rely upon the use of diagnostic probes to collect data that gets aggregated for presentation by the Systems Management Software. Network based diagnostics all currently require that some reporting mechanism be utilized for either collecting or reporting the diagnostic information. This is traditionally TCP/IP, STMP, or Java based and typically requires a platform specific setup and configuration. Furthermore, management access to the device being diagnosed is dependent upon the specific configuration of that platform. This complicates the process of root cause analysis for operational problems, as it requires accessing disparate software components and platforms.

DISCLOSURE OF THE INVENTION

A platform specific characteristic of a computer is ascertained using a computer application that is compliant with a platform independent specification. A message is received requesting diagnostic information about the computer, and a reply is sent conveying diagnostic information about the computer.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

MODE FOR CARRYING OUT THE INVENTION

Reference will now be made in detail to various embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
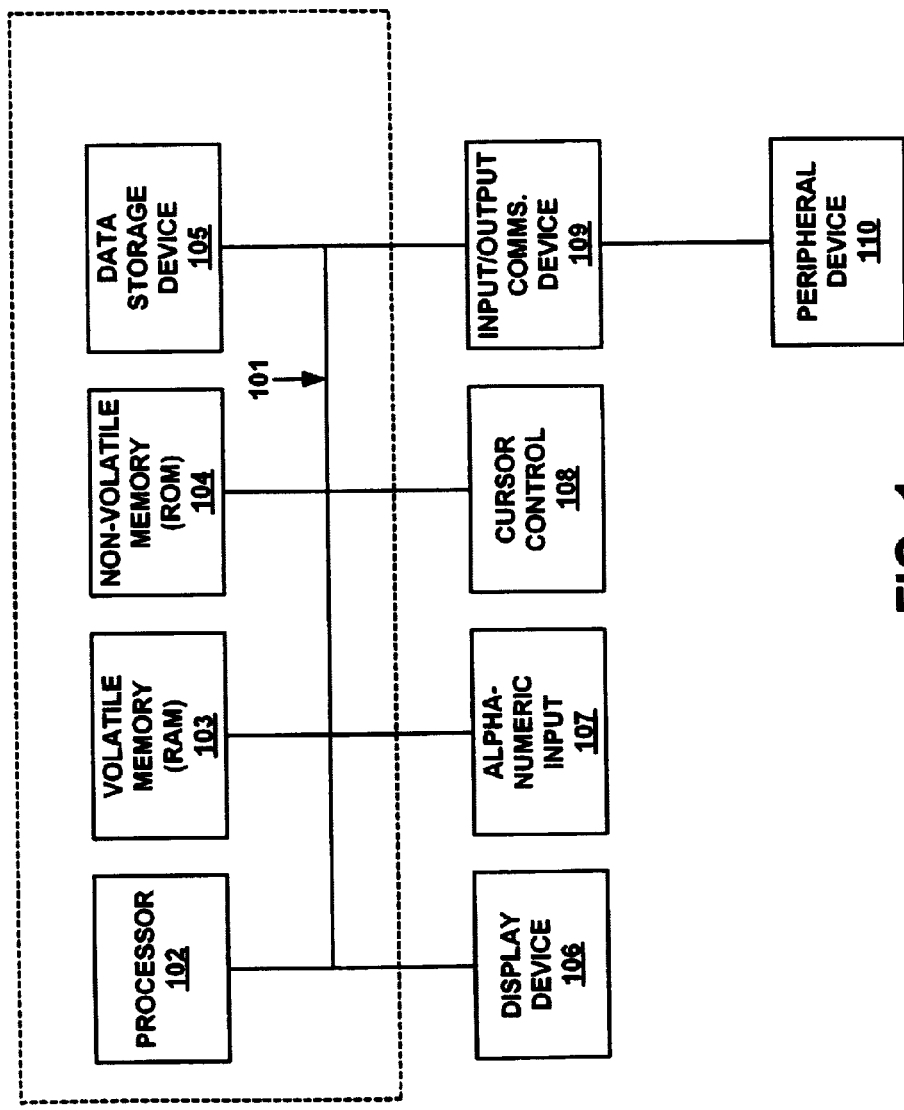
FIG. 1 is a block diagram of an exemplary computer system upon which embodiments of the present invention may be implemented.

With reference to FIG. 1, portions of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate within a number of different computer systems including general-purpose computer systems, embedded computer systems, laptop computer systems, hand-held computer systems, and stand-alone computer systems.

In the present embodiment, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing vast amounts of data. It should be noted that the software program for communicating data of the present invention can be stored either in volatile memory 103, data storage device 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Returning still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner displacement. Alternatively, it will be appreciated that a cursor can be directed and/or activated via input from alpha-numeric input 107 using special keys and key sequence commands. Alternatively, the cursor may be directed and/or activated via input from a number of specially adapted cursor directing devices.

Furthermore, computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks.

Figure 2:
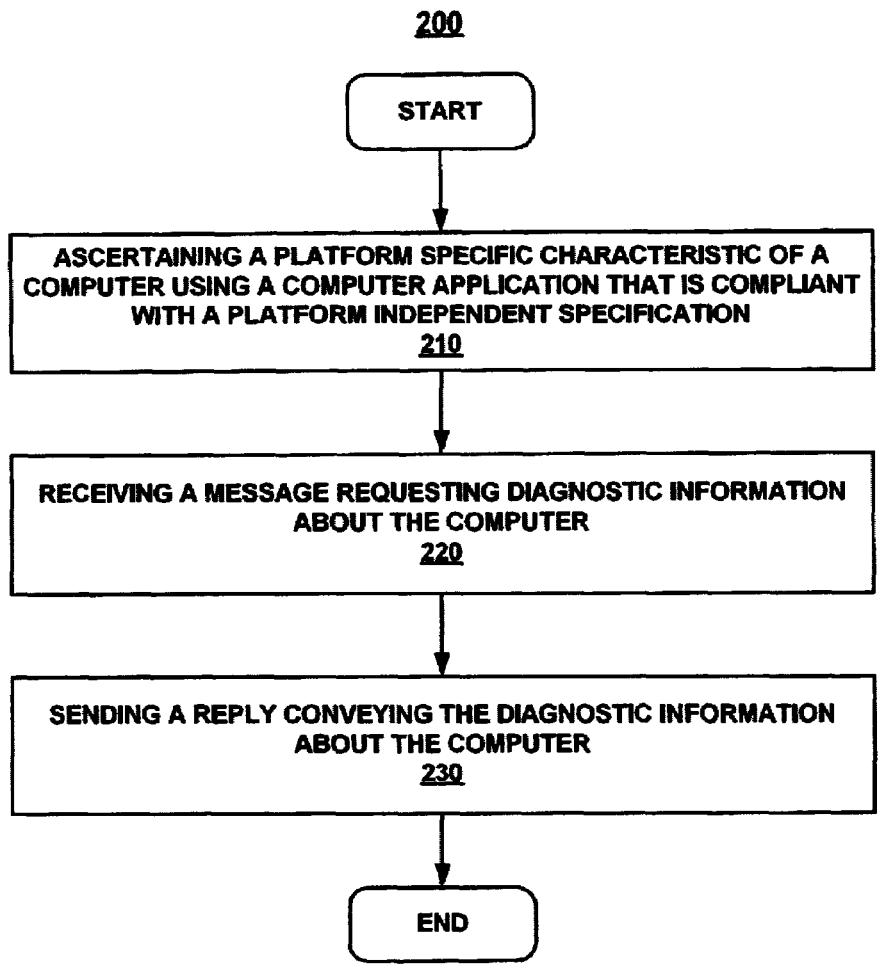
FIG. 2 is a flow chart of a method for communicating data in accordance with embodiments of the present invention.

FIG. 2 is a flow chart of a method for communicating data in accordance with embodiments of the present invention. In step 210 of method 200, a platform specific characteristic of a computer is ascertained using a computer application that is compliant with a platform independent specification. In the context of the present invention, the term platform refers to the underlying hardware or software for a particular computer system (e.g., computer system 100 of FIG. 1).

Currently, there are a wide variety of platforms which may comprise a network. Each of these may have a different operating system or group of software applications which are unique to that specific platform. This complicates network management due to the additional effort required integrate the various operating systems and computer applications into a cohesive network. This is problematic when trying to collect and report diagnostic information from a variety of platforms that may be found in a computer network. More specifically, each platform may require platform specific set-up and configuration procedures which are time consuming and may require diagnostic software that is not compatible with other platforms in the network.

Figure 3:
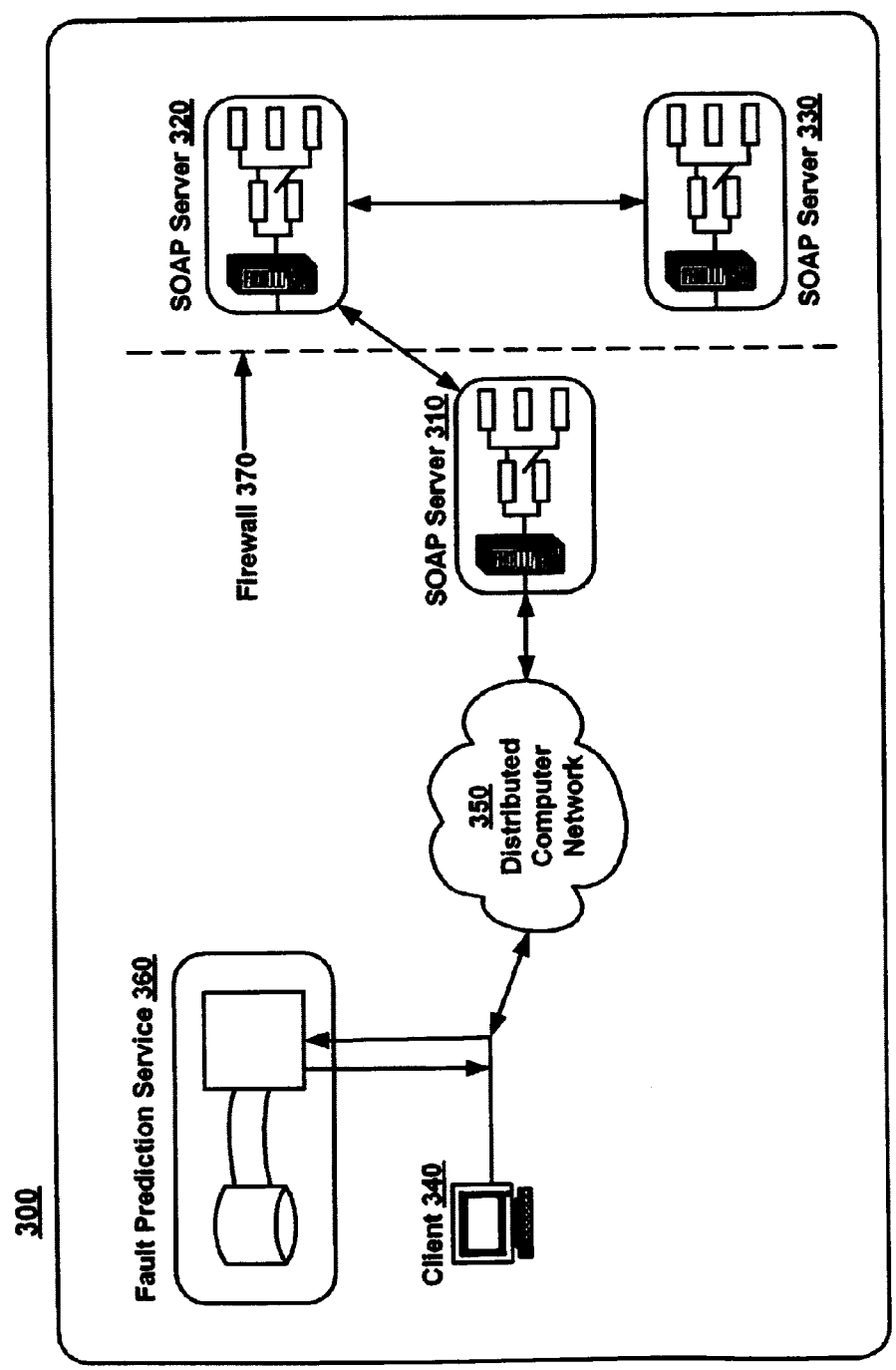
FIG. 3 is a diagram of an exemplary computer network upon which embodiments of the present invention may be implemented.

In embodiments of the present invention a diagnostic application is installed as a Web Service upon a server. Referring now to FIG. 3, a diagnostic Web Service application is installed upon each of SOAP servers 310, 320, and 330. The term Web Service describes a standardized way of integrating Web-based applications using the Simple Object Access Protocol (SOAP), the Web Services Description Language (WSDL), and the Universal Description Discovery and Integration (UDDI) open standards. XML is used to tag the data and provides a meta-language that can be customized to express complex interactions between clients and services or between components of a multi-platform network.

WSDL provides a way for Web Service providers to describe the basic format of Web Service requests by describing the services available, where they reside, and how to invoke them. WSDL defines services as collections of network endpoints or ports.

UDDI is used for listing services that are available. UDDI can be thought of as a Domain Name Service (DNS) for business applications. UDDI provides a mechanism for clients to dynamically find other Web Services. A UDDI registry has two kinds of clients: businesses that want to publish a service and its usage interfaces, and clients who want to obtain services of a certain kind and bind programmatically to them.

SOAP is a protocol specification that defines a uniform way of passing Remote Procedure Calls (RPCs) in a decentralized, distributed environment using HTTP as the underlying communication protocol. The format of the body of a SOAP message is defined using the XML specification. XML is used to tag the data within the message and provides a meta-language that can be customized to express complex interactions between clients and services or between components of a composite service. HTTP headers describe what is in the message and how a recipient should process it and are added to the XML encoded body of the message before sending it. SOAP does not itself define any application semantics such as a programming model or implementation specific semantics; rather it defines a simple mechanism for expressing application semantics by providing a modular packaging model and encoding mechanisms for encoding data within modules.

Thus, SOAP provides a way to access services, objects, and servers in a platform independent manner. Using SOAP, businesses can query, invoke, communicate with, and otherwise access services provided on remote systems (e.g., SOAP servers 310, 320, and 330 of FIG. 3) without prior knowledge of the remote systems location, operating system, or platform. Furthermore, SOAP messages can be directed to HTTP Port 80 of a server in order to penetrate server firewalls, which are typically configured to accept port 21 and port 80 File Transfer Protocol (FTP) requests.

Figure 4:
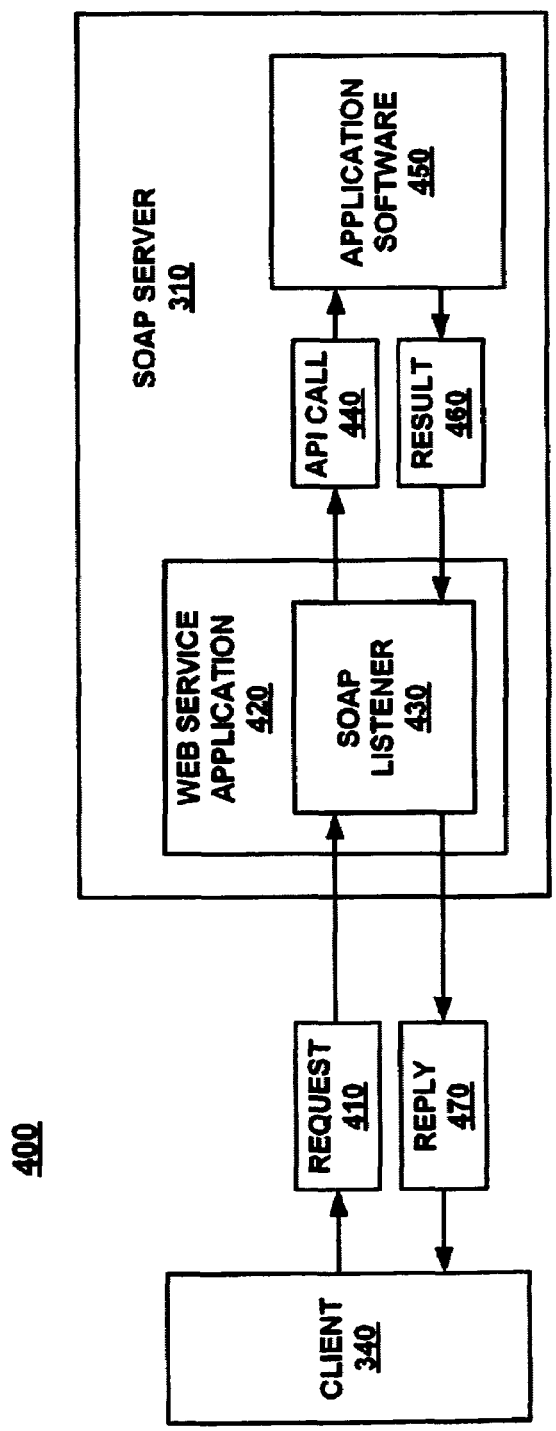
FIG. 4 is a block diagram of an exemplary implementation of a Web Service application in accordance with embodiments of the present invention.

FIG. 4 is a block diagram of an exemplary implementation of a Web Service application in accordance with embodiments of the present invention. A client (e.g., client 340) wanting to call a function formats a request 410 with SOAP XML encoding, and sends it to the SOAP server (e.g., SOAP server 310) using a mutually agreeable communication protocol, typically HTTP or Simple Mail Transfer Protocol (SMTP). The present invention is a Web Service application 420 that is installed upon a server (e.g., SOAP server 310) and can collect diagnostic information about SOAP server 310. In one embodiment, Web Service application 420 comprises a SOAP "listener" 430 that reads the XML information from the SOAP packets and generates an API call 440 to the appropriate application software 450 on server 310. The application software on server 310 processes the request and returns a result 460 to listener 430, which formats it into a SOAP XML encoded reply 470 and returns reply 470 to client 340. In embodiments of the present invention, Web Service application 420 is a diagnostic application that converts SOAP formatted messages into a platform specific request for diagnostic information that is understood by the local operating system on server 310. It is appreciated that application software 450 may comprise a computer operating system or other diagnostic software installed upon SOAP server 310

Web Services are primarily used as a means for businesses to communicate with each other and with clients using self-contained, self-describing, modular applications that can be published, located, and invoked across the Web. They provide uniformity for cross platform interactions and allow organizations to communicate data without requiring that they have detailed knowledge of the IT systems with which they are communicating. Web Services instead share business logic, data and processes through a programmatic interface across a network wherein which the applications themselves interface rather than the users. Web Services are not tied to any one operating system or programming language and allow different applications from different sources to communicate with each other without having to create custom coded software interfaces between specific platforms. For example, Java can talk with Perl, and Windows applications can talk with UNIX applications.

Once a Web Service is deployed, other applications, and other Web Services, can discover and invoke the deployed service as a component service. For example, an authentication service might be deployed that allows other users (e.g., a newspaper's Web site) to delegate authentication functions to the Web Service rather than creating their own authentication service. Other examples of component services that are reusable building blocks include currency conversion, language translation, shipping, inventory and ordering, and claims processing.

As stated above, embodiments of the present invention comprise a diagnostic application (e.g., Web Service application 420 of FIG. 4) that is installed as a Web Service. This overcomes disadvantages of the prior art in which platform specific applications for diagnostic applications were used. Because it is installed as a Web Service, the present invention is compliant with a platform independent specification and therefore overcomes prior art limitations that relied upon platform specific solutions.

In one embodiment, once Web Service application 420 is installed, it then determines the specific characteristics of the platform upon which it has been installed. For example, in one embodiment, Web Service application 420 generates commands that are compatible with a variety of computer operating systems. When a properly formatted response to one of its commands is received, Web Service application 420 will have determined the operating system that is being run on that particular platform. Web Service application 420 may then generate other operating system commands or API calls to determine other characteristics of the platform upon which it is running (e.g., is the platform running Java-based or C# based Web Services). This may also include determining other software applications that are installed upon the platform as well as other configuration and hardware characteristics (e.g., hard disk capacity, memory size, etc.) of the platform. The information that can be retrieved depends upon the type of platform upon which the present invention is installed as well as its specific configuration. While the present embodiment recites this method for ascertaining platform specific information, the present invention is well suited for utilizing other methods for determining platform specific characteristics as well. Thus, the present invention, while complying with a platform independent specification, is able to generate commands for ascertaining platform specific characteristics.

Additionally, embodiments of the present invention can collect diagnostic information about the platform upon which it is resident. This can include but is not limited to CPU utilization statistics (e.g., percentage of CPU utilization), memory utilization statistics, how many users are logged on, RAID level, the number of processes that are running at a given time, queue length, etc. Embodiments of the present invention can also run disk drive surface scans, computational tests, or other functionality tests, to measure performance characteristics. In one embodiment of the present invention a log of this information is kept on the server (e.g., SOAP server 310) upon which Web Service application 420 has been installed.

In step 220 of method 200, a message is received requesting diagnostic information about the computer. Referring again to FIG. 3, client 340 sends a request over distributed computer network 350 to the Web Service application 420 installed upon SOAP server 310 requesting diagnostic information about SOAP server 310. In accordance with embodiments of the present invention, client 340 can be a network administration console or, for example, a third party network management provider. Web Service application 420 on SOAP server 310 converts the SOAP formatted message from client 340 into a request that is understood by SOAP server 310. In other words, Web Service application 420 generates commands or API calls that are specific to the platform of SOAP server 310 in order to collect the requested diagnostic information. In embodiments of the present invention, the platform specific characteristics are collected in response to the message received in step 220 of method 200. However, in another embodiment of the present invention, the diagnostic information may be periodically collected and stored upon the SOAP server.

In step 230 of method 200, a reply is sent conveying the diagnostic information about the computer. In one embodiment, when the message requesting diagnostic information is received, the diagnostic information is collected and a reply sent conveying the diagnostic information. For example, client 340 sends a SOAP XML formatted request to SOAP server 310 requesting diagnostic information. A diagnostic Web Service application (e.g., Web Service application 420 of FIG. 4) that is resident upon SOAP server 310 converts the SOAP XML formatted message into a platform specific command or API call which SOAP server 310 can understand. A result (e.g., result 460 of FIG. 4) is returned to Web Service application 420. Web Service application 420 then formats result 460 into a SOAP XML formatted message and sends it as reply 470. Reply 470 conveys the requested diagnostic information about SOAP server 310 to client 340. In one embodiment, in response to request 410, Web Service application 420 sends diagnostic information that has been stored upon SOAP server 310 in reply 470.

Additionally, the diagnostic information may be stored upon a fault prediction service (e.g., fault prediction service 360 of FIG. 3). Predictive diagnostics builds upon the basic concept of fault monitoring by tracking faults over time and predicting when the next failure is likely to occur. Many Enterprise Management solutions rely upon using intermittent failure data (e.g., parity errors, disk stutter, etc.) to indicate and predict failures. The ability to predict failures significantly reduces MTTR, sometimes to zero, if problems can be resolved before they occur and thus helps in preventing extended outages of business computing infrastructure. The fault prediction service may also be used to track other parameters of a SOAP server by, for example, tracking changes in security permissions over time.

In embodiments of the present invention, a plurality of SOAP servers, each having a Web Service diagnostic application installed, may communicate diagnostic information between each other. Additionally, this capability can be extended across network firewalls collect diagnostic information about an organization's internal performance. For example, because Web Service servers describe their available services, a network map of SOAP servers can be created that can be promulgated to the Web Service diagnostic application of the present invention. Depending upon the security policy of the organization, a SOAP server outside of an organization's firewall can be used to collect diagnostic data from other SOAP servers inside the organization's firewall. Referring again to FIG. 3, a diagnostic Web Service installed upon SOAP server 310 can communicate across firewall 370 with a diagnostic Web Service installed upon SOAP server 320. This allows collecting diagnostic data concerning SOAP server 320 as well as data concerning communications between SOAP server 310 and SOAP server 320 (e.g., round trip time for a message between SOAP servers 310 and 320).

Additionally, SOAP server 320 can collect diagnostic data about other SOAP servers in the network that are not coupled with an outside SOAP server. For example, SOAP server 320 can collect diagnostic data from SOAP server 330 and forward that information to SOAP server 310 (and in turn to client 340 and/or fault prediction service 360). This allows comparison of data between internal network paths (e.g., between SOAP servers 320 and 330) and external network paths (e.g., between SOAP servers 310 and 320). Using this information, an administrator can identify a particular SOAP server which may be overtasked or other bottlenecks in network communication.

Thus, embodiments of the present invention allow collecting platform specific diagnostic information using an application that is compliant with a platform independent specification. This is advantageous in that special software interfaces are not needed in order to facilitate communication between non-compatible platform specifications.

Various embodiments of the present invention, a method for communicating data, are thus described. While the present invention has been described in particular embodiments, it should be appreciated that the present invention should not be construed as limited by such embodiments, but rather construed according to the following claims.

What is claimed is:

1. A method for communicating diagnostic data comprising:
    ascertaining a platform specific characteristic of a computer using a Web Service application that is compliant with a platform independent specification;
    receiving a message which is compliant with the Simple Object Access Protocol (SOAP) specification, said message requesting diagnostic information about said computer; and
    sending a reply conveying said diagnostic information about said computer.

2. The method as recited in claim 1, further comprising installing said Web Service application upon said computer.

3. The method as recited in claim 2, wherein said ascertaining comprises using said Web Service application to determine a computer operating system resident upon said computer.

4. The method as recited in claim 3, wherein said Web Service application translates said message into a format compatible with said operating system resident upon said computer.

5. The method as recited in claim 1, further comprising collecting diagnostic data about said computer in response to said receiving of said message.

6. The method as recited in claim 1, further comprising using said computer to collect diagnostic data from a second computer communicatively coupled with said computer.

7. The method as recited in claim 6, wherein a second Web Service application is resident upon said second computer and comprising conveying diagnostic information about said second computer to said computer using second said Web Service application.

8. The method as recited in claim 1, further comprising utilizing said diagnostic information to estimate the probability of failure of said computer.

9. A computer system comprising:
    a bus;
    a memory coupled to said bus; and
    a processor coupled to said bus, said processor for executing a method for communicating diagnostic data comprising:
        ascertaining a platform specific characteristic of a computer using a Web Service application that is compliant with a platform independent specification;
        receiving a message which is compliant with the Simple Object Access Protocol (SOAP) specification, said message requesting diagnostic information about said computer; and
        sending a reply conveying said diagnostic information about said computer.

10. The computer system of claim 9, wherein said Web Service application used to ascertain said platform specific characteristic is resident upon said computer system.

11. The computer system of claim 9, wherein said method further comprises installing said Web Service application upon said computer.

12. The computer system of claim 11, wherein said Web Service application is used to determine a computer operating system resident upon said computer.

13. The computer system of claim 12, wherein said Web Service application translates said message into a format compatible with said operating system resident upon said computer.

14. The computer system of claim 9, wherein said method further comprises collecting diagnostic data about said computer in response to said receiving of said message.

15. The computer system of claim 9, wherein said method further comprises using said computer to collect diagnostic data from a second computer communicatively coupled with said computer.

16. The computer system of claim 15, wherein a second Web Service application is resident upon said second computer and conveys diagnostic information about said second computer to said computer using said second Web Service application.

17. The computer system of claim 9, wherein said method further comprises utilizing said diagnostic information to estimate the probability of failure of said computer.

18. A computer-usable medium having computer-readable code embodied therein for causing a computer system to perform a method for communicating diagnostic data comprising:
    ascertaining a platform specific characteristic of a computer using a Web Service application that is compliant with a platform independent specification;
    receiving a message which is compliant with the Simple Object Access Protocol (SOAP) specification, said message requesting diagnostic information about said computer; and
    sending a reply conveying said diagnostic information about said computer.

19. The computer-usable medium of claim 18, wherein said method further comprises installing said Web Service application upon said computer using said computer-usable medium.

20. The computer-usable medium of claim 19, wherein said Web Service application determines a computer operating system resident upon said computer.

21. The computer-usable medium of claim 20, wherein said Web Service application translates said message into a format compatible with said operating system resident upon said computer.

22. The computer-usable medium of claim 18, wherein said method further comprises collecting diagnostic data about said computer in response to said receiving of said message.

23. The computer-usable medium of claim 18, wherein said method further comprises using said computer to collect diagnostic data from a second computer communicatively coupled with said computer.

24. The computer-usable medium of claim 23, wherein a second Web Service application is resident upon said second computer and conveys diagnostic information about said second computer to said computer using said second Web Service application.

25. The computer-usable medium of claim 18, wherein said method further comprises utilizing said diagnostic information to estimate the probability of failure of said computer.

* * * * *